(12) United States Patent
Richardson

(10) Patent No.: US 7,934,250 B2
(45) Date of Patent: Apr. 26, 2011

(54) METHOD AND APPARATUS FOR USING PERFORMANCE AND STRESS TESTING ON COMPUTING DEVICES FOR DEVICE AUTHENTICATION

(75) Inventor: Ric B. Richardson, Irvine, CA (US)

(73) Assignee: Uniloc USA, Inc., Irvine, CA (US)

( * ) Notice: Subject to any disclaimer, the term of this patent is extended or adjusted under 35 U.S.C. 154(b) by 1224 days.

(21) Appl. No.: 11/531,235

(22) Filed: Sep. 12, 2006

(65) Prior Publication Data
US 2007/0143073 A1    Jun. 21, 2007

Related U.S. Application Data

(60) Provisional application No. 60/716,421, filed on Sep. 12, 2005.

(51) Int. Cl.
*G06F 7/04* (2006.01)
*G06F 17/30* (2006.01)
*G11C 29/00* (2006.01)

(52) U.S. Cl. ............... 726/2; 714/25; 714/718; 726/16; 726/29

(58) Field of Classification Search .................. None
See application file for complete search history.

(56) References Cited

U.S. PATENT DOCUMENTS

| 7,463,945 B2* | 12/2008 | Kiesel et al. ............. 700/174 |
| 7,653,899 B1* | 1/2010 | Lindahl et al. ............. 717/128 |
| 2005/0138155 A1* | 6/2005 | Lewis ............. 709/223 |

* cited by examiner

*Primary Examiner* — Nasser Moazzami
*Assistant Examiner* — Fatoumata Traore
(74) *Attorney, Agent, or Firm* — Sean D. Burdick

(57) ABSTRACT

A method for authenticating a device including the steps of measuring at least one performance parameter of the device to obtain a measurement; and comparing the measurement of the at least one performance parameter with a previously stored measurement of the at least one performance parameter to determine an identity of the device. An apparatus and an article of manufacture for authenticating a device is also disclosed.

17 Claims, 2 Drawing Sheets

METHOD AND APPARATUS FOR USING PERFORMANCE AND STRESS TESTING ON COMPUTING DEVICES FOR DEVICE AUTHENTICATION

CLAIM OF PRIORITY UNDER 35 U.S.C. §119

The present application for patent claims priority to Provisional Application No. 60/716,421, entitled "Method for using performance and stress tests on computing and digital storage devices for the purposes of device authentication" filed Sep. 12, 2005, and assigned to the assignee hereof and hereby expressly incorporated by reference herein.

BACKGROUND

1. Field

The present invention relates generally to security in computing environments, and more particularly, to a method and apparatus for using performance and stress testing on computing devices for device authentication.

2. Background

A basic component of any security system is the authentication of not only the sender and receiver of secure communications or data, but also the devices that are used as part of the storage and communications process. Computing and digital storage devices have become commonplace for processing, storing and communicating digital information. In recent years, it has been a focus of the computing industry to make such devices secure.

One approach to securing devices is the introduction of secure components that have had a unique identity intentionally embedded into the components. These secure components are known in the art as "dongles." Another approach is to embed a unique identifier into the component itself. An example of this in the art is the use of a secure computing platforms where the main central processing unit (CPU), or "processor," features a hard coded serial number or encryption certificate that cannot be changed or modified after manufacture. Another example that is also currently in the art is hard disk serialization, where a unique number is permanently added or written to the hard disk for reference by the operating system.

One disadvantage of the above approaches to digital security and authentication is that the intentional predetermined identification of a device, such as by the use of a manufactured identifier or serialization number, is a specific and easily traced means of identification. This means that attackers and or reverse engineers have a specific and quantifiable target to initiate an attack on the security system.

SUMMARY OF THE PREFERRED EMBODIMENTS

The present invention provides a method for authenticating a computing device. In one preferred embodiment of the present invention, the method includes the step of measuring at least one performance parameter of the device to obtain a measurement and comparing the measurement of the at least one performance parameter with a previously stored measurement of the at least one performance parameter to determine an identity of the device.

An apparatus for authenticating a device is also disclosed. The apparatus includes a processor and a memory coupled to the processor. In one preferred embodiment, the memory is configured to cause the processor to execute a method including the step of measuring at least one performance parameter of the device to obtain a measurement and comparing the measurement of the at least one performance parameter with a previously stored measurement of the at least one performance parameter to determine an identity of the device.

An article of manufacture including a computer-readable medium having instructions stored thereon for causing a processor to perform a method for authenticating a device is also disclosed. The method including the steps of measuring at least one performance parameter of the device to obtain a measurement and comparing the measurement of the at least one performance parameter with a previously stored measurement of the at least one performance parameter to determine an identity of the device.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION

Computing devices, including such devices as processors and digital storage devices, possess a wide range of performance and stress test variations. Such variations are commonly used to evaluate devices for quality assurance purposes and often dictate whether a particular device is of a quality level to be sold or should be discarded/recycled.

Performance and stress tests may also be used to qualify devices for sale within one of many levels of grading of devices. For example, the maximum speed at which a processor operates is often used to classify the processor.

The present invention uses performance and stress test variations to identify a computing device for the purposes of uniquely identifying and authenticating the device. The present invention allows the device itself to be used as part of the authentication process and thereby reduces or eliminates the cost and time involved with adding and securing a separate identity token (e.g., dongle) to the device to be secured or authenticated.

The present invention further capitalizes on the natural occurrence of many and varied irregularities that appear both in the manufacturing process, and during the subsequent usage, of the device, and to use these performance characteristics in identifying a particular device. This in turn represents an ideal opportunity for developing unique identities that are hard to reproduce by attackers of authentication and security systems.

The approach described by the present invention allows a wide and diverse range of identifiers to be used to uniquely identify a protected computing device. The use of a wide and diverse range of identifiers significantly complicates the initial stages of any attacking or tampering process in that there is no central and easily identifiable identification component or serial number to attack.

In one preferred embodiment of the present invention, results from performance and stress tests of computing and digital storage devices are used to develop a unique profile for a device. The unique profile can then be used for authentication in security, copy control and access control applications.

Figure 1:
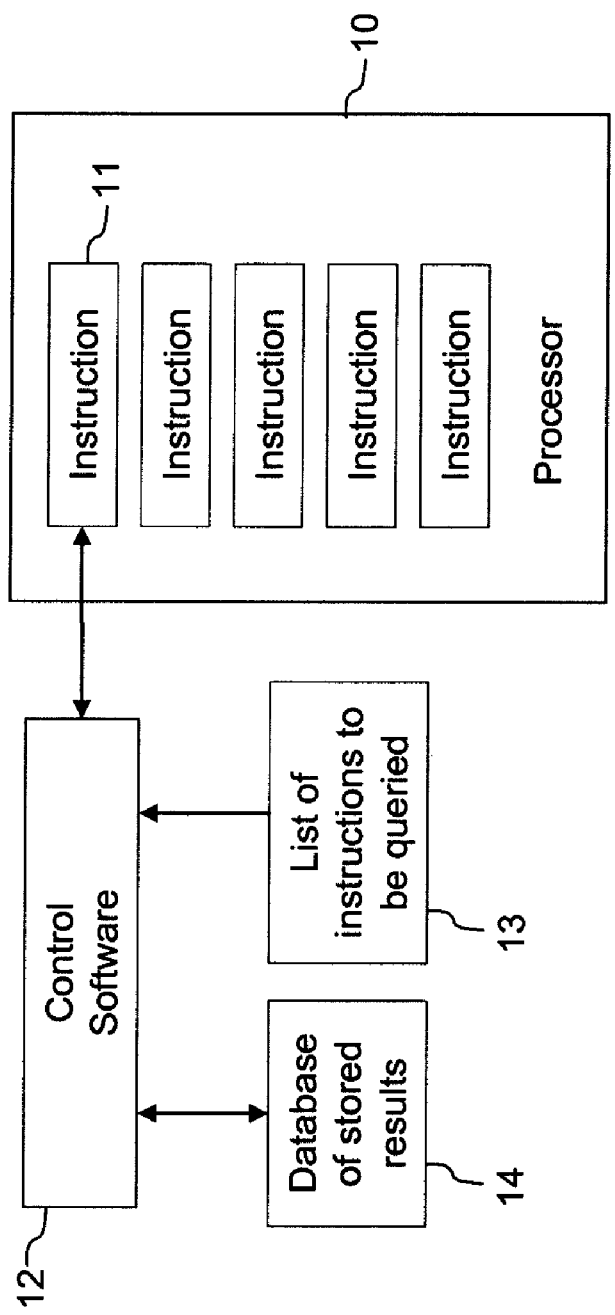
FIG. 1 is a block diagram of an identification system configured in accordance with one preferred embodiment of the present invention; and, FIG. 2 illustrates an identification process that can be used to uniquely identify a computing device in accordance with one preferred embodiment of the present invention.

FIG. 1 shows a block diagram of an identification system configured in accordance with one preferred embodiment of the present invention. A control software 12 is used for testing a computing device 10. In one preferred embodiment, the specific testing is achieved by the control software 12 querying computing device 10 using a list of processor-specific instructions 11 (i.e., the instructions that the computing device 10 can execute). The control software 12 uses a list of processor instructions 13 to explore the capabilities of the computing device 10. The results of the testing are stored in a database of results 14. As further described herein, the database of results 14 is also used by the control software 12 in a comparison of the test results obtained from the use of the list of processor-specific instructions 11 for the targeted computing device 10 (e.g., a processor) with other tests previously performed on other separate and unique computing devices (i.e., other processors). The test results that are determined to be separate and unique to the computing device 10 (i.e., the computing device currently being tested) can be used to uniquely identify the computing device 10.

Figure 2:
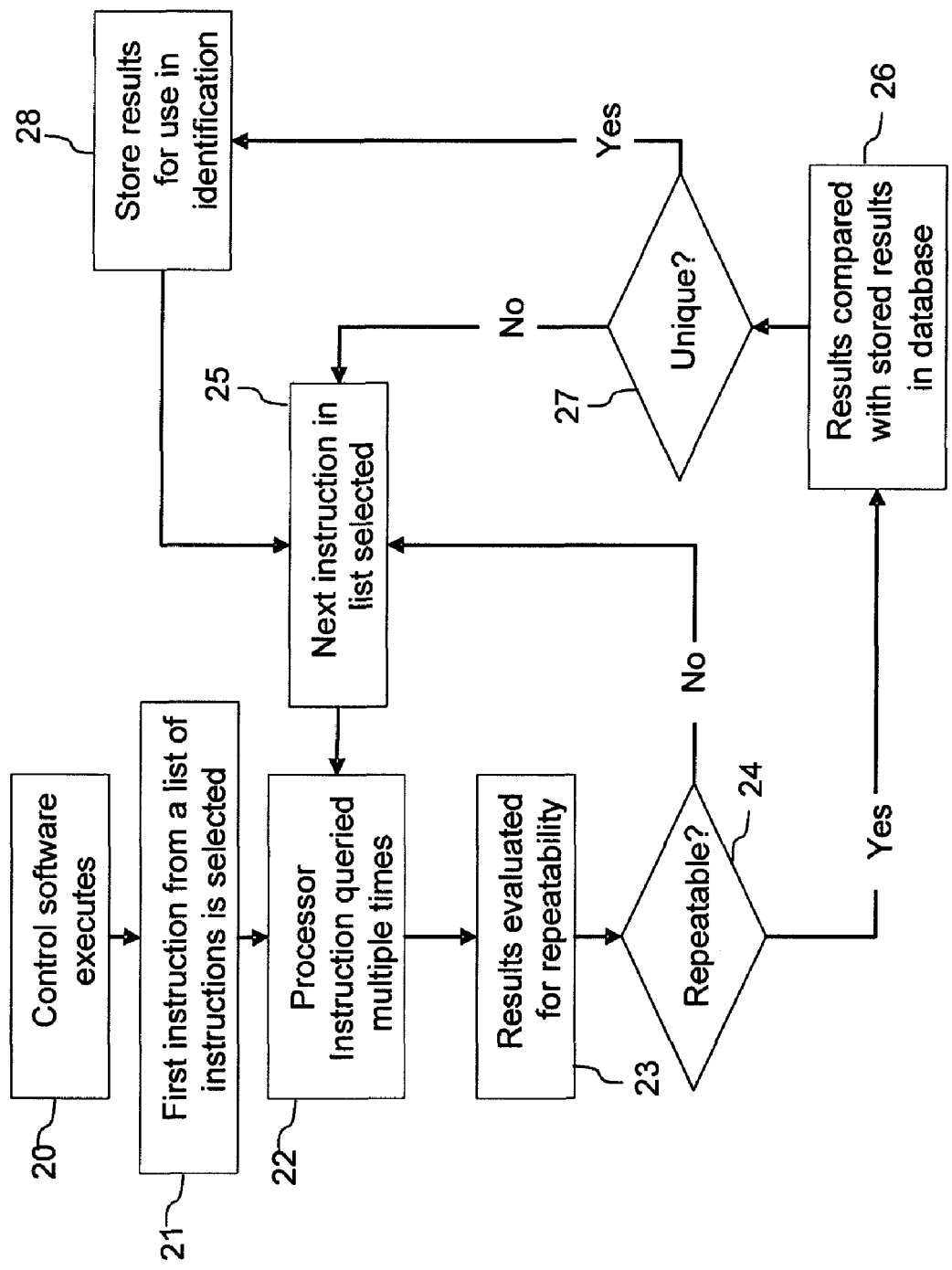

FIG. 2 illustrates an exemplary process that can be used to obtain unique information from a computing device to be used for the purposes of identifying the computing device. The description of FIG. 2 will be accomplished with reference to the components described in FIG. 1.

Initially, the control software 12 is executed in step 20. In one preferred embodiment, the first processor instruction is selected from the list of processor instructions in step 21 and the control software 12 executes the processor instruction as part of a query in step 22 that is executed multiple times in succession. The results from these queries are compared and evaluated for changes in step 23. If the test results cannot be repeated with sufficient accuracy for delivering a repeatable and consistent result, as determined in step 24, the control software 12 selects the next processor instruction to be tested 25 from list of processor instructions 13. In one embodiment, for a test result to be repeated with sufficient accuracy, the measured value returned from each test must be equal from test to test. In another preferred embodiment, the measured value returned from each test must be within a particular range. In other preferred embodiments, various tolerances may be used to indicate that the test result is repeatable or reproducible with sufficient accuracy.

If the test results can be repeated with sufficient accuracy for delivering repeatable and consistent results in step 24, the control software 12 will compare the results of the test with the database of stored results 14 from other computing devices in step 26.

If the results from the comparison show that the test results are unique to the computing device being tested (i.e., computing device 10) in step 27, the control software 12 stores the results of the test for use in identifying the computing device in the future. The control software 12 then selects the next processor instruction to be tested in step 25 from the list of processor instructions used by the control software 12.

Referring still to FIG. 2, an alternate description of the identification process of the present invention follows, where the test program 12 runs a series of computational processes through the computing device 10 in step 22. The results of each individual test are evaluated in step 23. The results are measured in terms of how many times an instruction from, for example, the list of processor instructions 11 is executed by the computing device 10 in a set period of time or, conversely, how long it takes computing device 10 to successfully execute an instruction a preset number of times. These results are then tabulated in step 23 that can be used by an authentication software, which can also be control software 12, to evaluate the test results for repeatability in step 24. These results are then compared with the database of stored results from other computing devices in step 26. If the device test results and timings are unique and repeatable on the device being tested, as determined in step 27, the authentication software stores the results in step 28 and uses the test results and timings as the foundation of a device identity token that can be compared with the target device in the future to verify the identity of the computing device 10.

Although the exemplary system and process discussed above was with reference to a processor as computing device 10, other computing devices such as digital storage devices or other components may be used. For example, in another preferred embodiment of the present invention, the same process is applied to digital storage devices where performance and speed tests of the storage media are performed. Rather than using a series of computational problems as in the evaluation of a computing device, performance and speed tests of digital storage devices could involve the reading, writing and transferring of data across multiple storage device location addresses within the storage device.

It should be noted that the methods described herein may be implemented on a variety of communication hardware, processors and systems known by one of ordinary skill in the art. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as the most preferred or advantageous over other embodiments. Accordingly, the present invention is to be defined solely by the scope of the following claims.

What is claimed is:

1. A method for determining unique identity for a computing device, comprising steps of:
    running, by means of control software, a stress test on the computing device;
    obtaining a result from the stress test;
    comparing the result of the stress test to results of the stress test previously obtained from other computing devices; and
    deriving from the test result an identity token for the computing device if the comparing step determines that the test result is unique to the computing device.

2. The method of claim 1, further comprising the control software:
    selecting the stress test from a plurality of stress tests;
    executing the running, obtaining and comparing steps; and
    if the comparing step fails to determine that the test result is unique, selecting another stress test from the plurality of stress tests and repeating the method beginning with the running step.

3. The method of claim 1, further comprising repeating the running, obtaining, and comparing steps a number of times to determine reproducibility of the result.

4. The method of claim 1, wherein the stress test comprises:
    issuing a first instruction to the computing device; and
    determining, as the result, an execution time for the first instruction.

5. The method of claim 1, wherein the stress test comprises:
    issuing a plurality of instructions to the computing device; and
    determining, as the result, a number of instructions executed by the computing device in a predetermined time period.

6. The method of claim 1, wherein the stress test comprises:
    issuing a plurality of instructions to the device; and
    measuring, as the result, time required for the computing device to execute the plurality of instructions.

7. The method of claim 1, wherein the device is a processor.

8. The method of claim 1, wherein the device is a digital storage device.

9. The method of claim 1, wherein the measurement is based on time.

10. The method of claim 1, wherein the measurement is based on speed of the device.

11. A method for authenticating a computing device, comprising:
    running, by means of control software, a stress test on the computing device;
    obtaining a result from the stress test;
    comparing the result of the stress test to results of the stress test previously obtained from computing devices; and
    authenticating the computing device if the test result is equal to at least one of the results obtained from the computing devices.

12. An article of manufacture comprising a non-transitory computer-readable medium having control software stored thereon for causing a processor to perform a method for authenticating a device, the method comprising steps of:
    running, by means of control software, a stress test on a target computing device;
    obtaining a result from the stress test; comparing the result of the stress test to results of the stress test previously obtained from other computing devices; and
    deriving from the test result an identity token for the target computing device if the comparing step determines that the test result is unique to the target computing device.

13. The article of claim 12, wherein the method further comprises:
    selecting the stress test from a plurality of stress tests;
    executing the running, obtaining and comparing steps; and
    if the comparing step fails to determine that the test result is unique, selecting another stress test from the plurality of stress tests and repeating the method beginning with the running step.

14. The article of claim 12, wherein the method further comprises repeating the running, obtaining, and comparing steps a number of times to determine reproducibility of the result.

15. The article of claim 12, wherein the stress test comprises:
    issuing a first instruction to the target computing device; and
    determining, as the result, an execution time for the first instruction.

16. The article of claim 12, wherein the stress test comprises:
    issuing a plurality of instructions to the target computing device; and
    determining, as the result, a number of instructions executed by the target computing device in a predetermined time period.

17. The article of claim 12, wherein the stress test comprises:
    issuing a plurality of instructions to the target computing device; and
    measuring, as the result, time required for the target computing device to execute the plurality of instructions.

* * * * *